(12) United States Patent
Kane

(10) Patent No.: US 11,775,631 B1
(45) Date of Patent: Oct. 3, 2023

(54) SYSTEM AND METHOD FOR PERFECTING AND ACCELERATING BIOMETRIC IDENTIFICATION VIA EVOLUTIONARY BIOMETRICS VIA CONTINUAL REGISTRATION

(71) Applicant: KNWN TECHNOLOGIES, INC., Boca Raton, FL (US)

(72) Inventor: Richard Lawrence Kane, Boca Raton, FL (US)

(73) Assignee: KNWN TECHNOLOGIES, INC., Boca Raton, FL (US)

( * ) Notice: Subject to any disclaimer, the term of this patent is extended or adjusted under 35 U.S.C. 154(b) by 676 days.

(21) Appl. No.: 16/590,285

(22) Filed: Oct. 1, 2019

Related U.S. Application Data

(60) Provisional application No. 62/766,099, filed on Oct. 2, 2018.

(51) Int. Cl.
| | |
|---|---|
| *G06F 21/45* | (2013.01) |
| *G06F 21/00* | (2013.01) |
| *G06N 20/00* | (2019.01) |
| *H04L 9/40* | (2022.01) |

(52) U.S. Cl.
CPC ............ *G06F 21/45* (2013.01); *G06N 20/00* (2019.01); *H04L 63/0861* (2013.01)

(58) Field of Classification Search
CPC ... H04L 9/32; G06N 3/08; G06N 20/00; G06F 21/30; G06F 21/32; H04L 63/08; H04L 63/0884; H04L 63/0861
See application file for complete search history.

(56) References Cited

U.S. PATENT DOCUMENTS

| | | |
|---|---|---|
| 2019/0260742 A1 | 8/2019 | Arora et al. |
| 2019/0303553 A1* | 10/2019 | Choiniere et al. ..... G06F 21/32 |
| 2020/0082062 A1* | 3/2020 | Mequanint et al. .... G06V 40/50 |
| 2020/0210781 A1* | 7/2020 | Desilets-Benoit et al. ................. G06V 40/20 |

* cited by examiner

*Primary Examiner* — Olugbenga O Idowu
(74) *Attorney, Agent, or Firm* — DANIEL S. POLLEY, P.A.

(57) ABSTRACT

A system and method for automatically updating biometric data for a user by preferably retaining an ongoing digital collection of images/biometric captures/IOT ("Internet of Things") captures taken over the life of the user. Changes in appearance of the user due to age, health, facial hair, hair color, hair length and many other evolutionary changes are automatically captured and contribute to the learning set. Accordingly, the system itself gets smarter and faster with every subsequent authentication. In one non-limiting embodiment, a target of the most recent 500 captures are retained, and tuning may suggest a greater number of captures should or could be used. Preferably, with each new capture the oldest capture in the ongoing digital collection is automatically deleted by the system.

12 Claims, 3 Drawing Sheets

SYSTEM AND METHOD FOR PERFECTING AND ACCELERATING BIOMETRIC IDENTIFICATION VIA EVOLUTIONARY BIOMETRICS VIA CONTINUAL REGISTRATION

This application claims the benefit of and priority to U.S. Application Serial No. 62/766,099, filed Oct. 2, 2018, which application is incorporated by reference in its entirety for all purposes.

1. FIELD OF THE INVENTION

The disclosure relates generally to internet use and transaction security, as well as all areas of access control and more particularly to increasing biometric accuracy and speed via continual learning.

2. BACKGROUND

Current solutions for biometrically authenticating individuals rely on a one-time static registration process and fail to update after a person a has signed up for a service. Today's biometric solutions have limited use and are typically tethered to a specific device or stored in a centralized database. The existing market solutions do not adapt with people's physical changes, nor with environmental changes. This can lead to identification failures.

Biometric characteristics change not only in gross fashion over longer periods of time, but in a daily cycle as well. One's level of hydration, the lighting at the time of capture (and in particular the angle of lighting and the shadows), the use of sunscreen or cosmetics, all alter the surface reflectivity, color, pallor, and even dimensions of measurement. Changes in expression between captures also alter measurements.

Without limitation, the disclosed novel system and method is directed to reducing and balancing the above identity/authentication issues concerning accuracy and reducing false negatives and is also directed to improving the speed of authentication through a novel and effective approach of evolving a biometric signature with each subsequent validation.

SUMMARY OF THE DISCLOSURE

A novel system and method is disclosed for reducing and balancing identity/authentication issues concerning accuracy and reducing false negatives while at the same time also improving the speed authentication through evolving a biometric signature with each subsequent validation. In one non limited embodiment, the system can initially capture a set of 20 high resolution images to help with angles, shadows, and expression changes, though other number of images can be captured and are also considered within the scope of the disclosure. Digitally capturing a sufficient number of images can help offset some of the expression and angle issues currently experienced. The capture can preferably include instructions to the person whose image is being captured to look in different directions, change the tilt and angle of the head, and the expressions, etc. Subsequent captures at different times of day can also be incorporated to further enhance recognition in the daily hydration cycles, and grosser (i.e. more obvious) changes of hair color, length, weight, etc. also further enhance accuracy and recognition.

The novel disclosed system preferably retains an ongoing digital collection of images/biometric captures/IOT ("Internet of Things") captures taken over the life of a client or user (i.e. preferably registered) (collectively referred to as "client" hereinafter) of the system. Changes in appearance of the client due to age, health, facial hair, hair color, hair length and many other evolutionary changes are captured and contribute to the learning set. Accordingly, the system itself gets smarter and faster with every subsequent authentication. In one non-limiting embodiment, a target of the most recent 500 captures are retained, and tuning may suggest a greater number of captures should or could be used. Furthermore, though currently 500 captures are retained, such value is not considered limiting and a higher or lower number of captures can be retained and used by the system and are also considered within the scope of the disclosure.

The system can preferably store the biometric capture alongside myriad sensor data including IOT data. Additionally, Applicant incorporates by reference in its entirety as if fully set forth herein, Applicant's co-pending application entitled "System and Method For Securing, Perfecting and Accelerating Biometric Identification Via Holographic Environmental Data" (U.S. Application Serial No. 16/458,509 filed on Jul. 1, 2019). From this sensor and/or IOT data, the system can automatically deduce a person is in their vehicle, at a location they frequent, at the beach near a parking meter, or any associated location. As non-limiting examples: (1) a user who drives a convertible wearing dark glasses and a cap can have a set of images related to IOT data that fit a pattern matching the partial capture to that environment; (2) a user who's capture is near parking meters at the beach may have a bright sun capture; and (3) a user at their cubicle can have a blueish tint due to the office lighting. In this manner, overtime the system can improve accuracy and selectivity while reducing false positives.

The system can automatically and continually register a client, preferably through capturing and storing raw data through leveraging the growing ubiquity of bandwidth, storage and compute power. By accumulating a data set on each client, the system can automatically evolve the knowledge of a user's identity including, but not limited to, their changing appearance, patterns of behavior, and associated devices.

Some non-limiting features, benefits, advantageous and/or characteristics of the disclosed method, system and platform, can include:
1. Increases recognition accuracy
2. Allows for the improvement of the recognition algorithms
3. Automatically adapts to the user's appearance over time.
4. Morphs from capture to capture
5. Offsets sub-optimal scenarios of lighting, camera angle, cluttered backgrounds
6. Offsets partial images
7. Offsets blurred images The novel platform/system provides for an evolving user identity using IoT, AI and biometrics to provide for automatic, continuous, self-learning biometric identity authentication. In one non-limiting example, facial recognition can be used for the biometrics component. With the facial recognition, AI and IoT technologies, the novel platform provides and enables continuous protection and authentication with privacy and security for every identity transaction. Thus, the novel platform is preferably intelligent and can evolve with the user at every interaction and thus evolves and recognizes any physical or environmental changes for the user.

For purposes of authentication each person's face is unique and ever evolving. Unlike prior biometric facial recognition solutions that use static data points, the disclosed platform/system can preferably use the person's whole face view preferably via high-resolution images and continues to automatically capture and learn about such person's face characteristics with every interaction therewith. The high-resolution images can be broken down by pixels to train the platforms neural network on a more robust (as compared to prior techniques) set of characteristics from onboarding the information/data through every interaction with the person. Preferably, though not limiting, the platform/system can manage up to five hundred (500) of the most recent images of a particular person to perfect the system/platform on such person and allow for evolvement of the person's physical and environmental changes over time. Preferably, the platform can remove or does not involve any racial or gender bias. The platform can also eliminate the need for storage of biometric keys and data. The platform is able to transact with or on any camera-enable device. And removes any requirement that the biometric data be tethered to a specific device.

Thus, the disclosed novel platform/system can utilize artificial intelligence within every layer of its technology stack. The platform evolves with each user on every interaction it is involved with, making the platform faster, more secure and accurate with every use. The platform preferably does not use or require any special or custom hardware and can be deployed and used across any camera-enabled device, which allows for portable biometrics and identity. The platform preferably does not store all of the user date in a centralized database. Rather, the user data can be preferably wrapped in intelligent code, distributed, parsed and managed similar to blockchain technologies. Thus, the data can be partitioned and distributed across geographies and then retrieved and reassembled when needed.

The system/platform profile can extend beyond basic biometrics to IOT device registration and AIpattern analysis and can learn the Bluetooth, MAC and network devices (IOT devices) that are present with each subsequent validation to learn what the particular client carries. It can also learn the locations frequently visited and the devices at those locations for the client.

The system/platform can be continually learning and preferably regularly and automatically retrains its knowledge base when a client validates on the system/platform's network, at intervals when the network is under utilized and/or when new clients join the network.

The platform's preferred unbundled APIs can be designed to provide a digitally driven business the ability to quickly and seamlessly integrate the platform into their existing software applications. As non-limiting examples, the unbundled components can be used as REST APIs with JSON and SOAP APIs with XML, thus, making for easy/seamless integration to and deployment with any existing platform, such as, but not limited to, Web based operating systems, Apple IOS, Android, etc.. As mentioned above, the novel platform and method described herein can be used on any camera-enabled mobile device, including, without limitation, smartphones, tablets, laptops, etc.

The platform/system can use device communication to build a layer of authorization and encryption around a user's identify data and allows for accelerated and more accurate biometric authentication and retrieval in a one-to-many search as compared to current technologies. As mentioned above, facial recognition and AI can be used to evolve with the platform users during every interaction and the system/platform teaches itself with the introduction of new technologies.

Thus, in one non-limiting use example, the system and method for continuous updated biometric data as disclosed herein, can be used in an electronic platform/system and method that uses electronic data to protect itself by realizing where an individual's device is and where it is being accessed from. As the internet expands into the physical world, with every device being IP enabled and addressable, the geographic proximity, network proximity, proximity to the access point of the internet, the authentication, encryption and presentation and flow of data can be linked to an increasingly addressable and measurable physical reality, a moment in time and a proximity to other data and objects using the system and method. The data itself is IP accessible in the form of IP addressable storage devices, and subject to the same techniques. Geographic, chronological and addressable interrelationship of the data as it is packetized and distributed, and the devices as they communicate, form a fabric. In total, a holographic layer of authorization, encryption, and distribution of data can be created by spanning the fabric of IP addressable objects and data. As the number of types of these devices proliferate, it becomes geometrically more complex to replicate the local fabric. A unique encryption key, access method, authentication method, and data distribution framework is disclosed. This unique key can further be utilized to subset biometric identification such that the number of biometric signatures to be compared may be minimized, potentially down to one, thereby geometrically speeding up biometric identification while perfecting its security.

DETAILED DESCRIPTION

Figure 1:
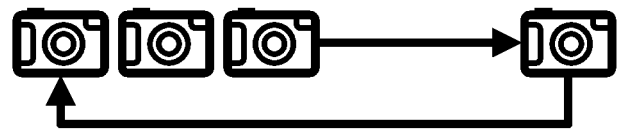
FIG. 1 is a block diagram of a non-limiting scenario of accumulation and continual learning on a data set of the most recent 500 images in accordance with the system and method of the present disclosure.

As seen in FIG. 1, a non-limiting example of automatic capturing and continual learning by the system/platform of the most recent (500) images is illustrated. The 500 images is a preferred non-limiting value, and image captured/retained values higher and lower than 500 can be used with the system and method and are considered within the scope of the disclosure. It should be recognized that the more information the system/platform is provided with for an individual's profile, as well as the more up-to-date such information is, will provide for a faster/better/more accurate authentication/identification of the individual (i.e. client) associated with the profile. This results from an abundance of IoT and biometric profile data for the system/platform to learn from. As seen, an access request from a device or individual can be preferably tempered by items in the immediate vicinity of the individual or device as well as items on the same local network. In this way, the disclosed system/platform can preferably identify adjacent servers, human co-workers, adjacent AIs, and the network traffic fingerprints that define or help to define the location.

Individuals can create accounts/profile with the platform/ system in various non-limiting ways. In a preferred embodiment, an App (application software program) is downloaded by the individual to their specific camera-enabled device, such as, but not limited to, a smartphone (collectively "Individual's Device"). Typical information can be supplied such as one or more of the following: name, email, address, phone number, etc. A one-time code can be sent (i.e. SMS text message) to the phone number provided for the individual's electronic device and the code is entered on the App screen to confirm the user's phone. Once the code has been entered and the user/phone confirmed, the user's camera-enabled device allows the App to capture several photographic images of the individual's face from several different angles, such as, without limitation, one or more of the following: straight on-front, turned left, turned right, positioned up - looking up; positioned down – looking down, smiling, etc. Though preferably the biometric data is an image of the individual for their particular profile with the system/platform, such is not considered limiting, and other biometric data can be also be included in addition to the images or in lieu of the images and use of such other biometric data is also considered within the scope of the disclosure. The other user contact information can be manually entered or obtained from a preferably pictured government ID (i.e. driver's license) that is also captured by the App (preferably front and back). The user's contact information taken from the ID can be verified by the user with respect to accuracy. The system/platform can also compare the captured image to the image on the ID. The user can also establish a confidential PIN for additional security. A credit card for the user can be scanned (i.e. captured) and/or entered manually. Though not limiting the expiration date and security code for the card can be entered manually. The credit card information can also be verified by the user for accuracy. Other financial payment methods for the individual can also be saved for the user's profile. Once completed, the user's profile has been established and saved with the platform/system.

In a preferred non-limiting embodiment, capturing the user's initial images can comprise taking 20 or about 20 slices of high-resolution images, which is also used for training the platform/system's neural network. The number of images originally captured is not limited to 20 images and a higher or lower number of images can be initially captured and all are considered within the scope of the disclosure. During this process the system/platform can also be building the identity layer around the user's Individual Device, and communication with the devices around them, which can be used later by the platform/system to anticipate future actions by the user to allow the platform/system to prefetch the user's/individual's captured biometric data so that it is available quicker for the authentication process during the anticipated future action.

In one non-limiting embodiment/example, the system/ platform can be used as a payment choice for an online order. After the user selects the system/platform choice from the payment options from a point of sale terminal or other separate device, the point of sale terminal or separate device is used to capture a face biometric capture of the individual. The captured biometric is compared by the platform/system and if the user is authenticated, a payment screen appears or is displayed to the user asking the user if they wish to use their credit card on profile or another payment method. Once the user hits pay the payment is processed.

When a user/individual who has previously joined the platform/system and has a profile wants to sign in, they preferably sign in (after selecting Sign In on the screen of the App) by using their Individual Device to capture a live video or image of them currently. The best image/frame from the captured video or image can be preferably used to authenticate the user. The captured image or video and/or best image from the video can be preferably saved to the Individual's profile to allow the system/platform to continue to evolve and account for any physical/environmental changes to the user's appearance.

Once the user is authenticated, a summary screen can appear on the App, showing, without limitation, the user's name, the accuracy of the authentication, how many recognitions the user has and associated Bluetooth Low Energy ("BLE") devices, which can be considered the relevant metric. Thus, the platform/system can be automatically learning the holographic environmental data communicating with the user's device(s). As the application the user signs into recognizes the user's device(s), platform/system automatically prefetches the user's information, so that it is available for use in authenticating the user quicker, which in turn results in the authenticating of the individual occurring quicker. This information regarding the BLE devices also can act as a passive first factor of authentication (i.e. "What I have") when confirming the user's identity. The user's face image (i.e. biometric) can become the second factor.

Thus, for use with "point-of-sale" or "separate device" transactions, the platform/system provides a user with a portable identity. As discussed above, the user has the ability to make a payment on a completely separate camera enabled device without having to use their Individual Device. Thus, any data or information can be brought forward to make a transaction and the system/platform is able to perform the authentication and retrieval relatively very quickly because of the internet of things (IoT) prefetching of the user's information in view of the platform/system recognizing that the user had his or her phone on or near them, and the system/ platform recognized the communication with all the other devices around the user which created a unique digital fingerprint.

Preferably, the biometric matching can be performed by one or more servers (e.g. the cloud, etc.). The workload can be preferably distributed on virtualized servers anywhere. Speeds down to $\frac{1}{8}^{th}$ of a second including the round trip using parallel computing in the cloud have been accomplished with the system/platform in view of the pre-fetch. The pre-fetch figures out what comes next and gets ready for it, thus reducing time needed. As mentioned above, more information regarding a preferred embodiment for performing the pre-fetch is described, and incorporated by reference in its entity, in our co-pending application serial no. 16/458,509 filed on Jul. 1, 2019 and entitled "System and Method For Securing, Perfecting and Accelerating Biometric Identification Via Holographic Environmental Data". In one non-limiting example, the system/platform can expect a user's biometric request when it sees one of the user's devices or recognize one of his or her patterns.

Preferably, the system/platform and method are not dependent on devices, but instead are preferably device neutral.

The electronic platform/system and method uses electronic data to protect itself by realizing where an individual's device is and where it is being accessed from. As the internet expands into the physical world, with every device being IP enabled and addressable, the geographic proximity, network proximity, proximity to the access point of the internet, the authentication, encryption and presentation and flow of data can be linked to an increasingly addressable and measurable physical reality, a moment in time and a proximity to other data and objects using the system and method. The data itself is IP accessible in the form of IP addressable storage devices, and subject to the same techniques. Geographic, chronological and addressable interrelationship of the data as it is packetized and distributed, and the devices as they communicate, form a fabric. In total, a holographic layer of authorization, encryption, and distribution of data can be created by spanning the fabric of IP addressable objects and data. As the number of types of these devices proliferate, it becomes geometrically more complex to replicate the local fabric. A unique encryption key, access method, authentication method, and data distribution framework is thus disclosed. This unique key can further be utilized to subset biometric identification such that the number of biometric signatures to be compared may be minimized, potentially down to one, thereby geometrically speeding up biometric identification while perfecting its security. Accordingly, the programs and data protect themselves by realizing where they are and where they are being accessed from.

Figure 2:
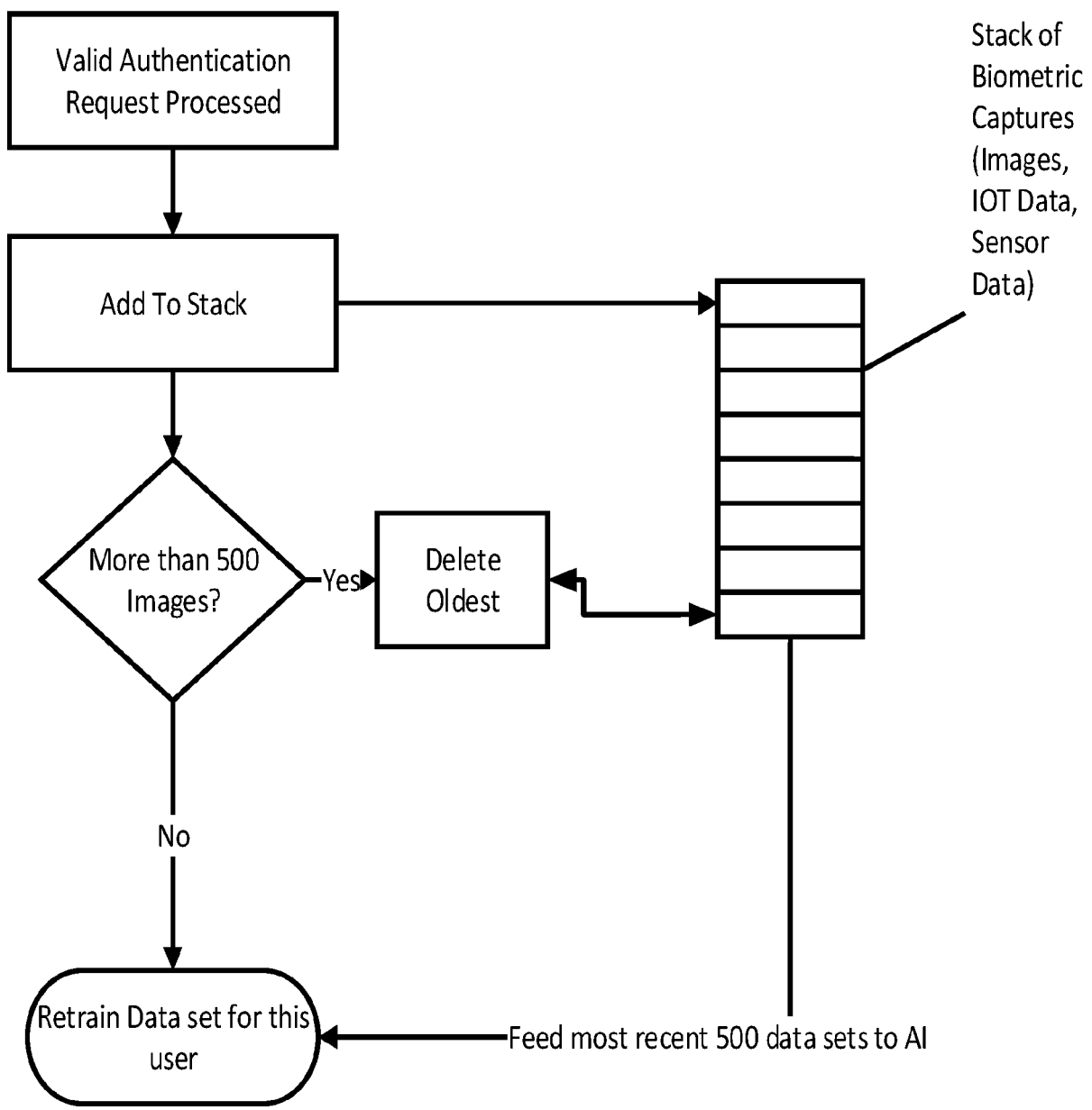
FIG. 2 is a non-limiting process flow diagram for updating the biometric data for a user by adding newly captured biometric data while deleting older data in accordance with the system and method of the present disclosure.

As seen in FIG. 2, after a successful biometric match of an incoming request, the request (captured biometric data) can be added to the stack of biometric data sets associated with the identified user. If more than X requests are present in stack, the oldest request (i.e. captured data) can be deleted. As mentioned above, in a non-limiting embodiment the value for "X" can be 500. The AI of the system/platform is then automatically retrained for that user against the entire stack of biometric data sets on file. The AI can also automatically re-learn the differentiation of this user against all users on file and can automatically re-learn after every biometric request in near real time.

Figure 3:
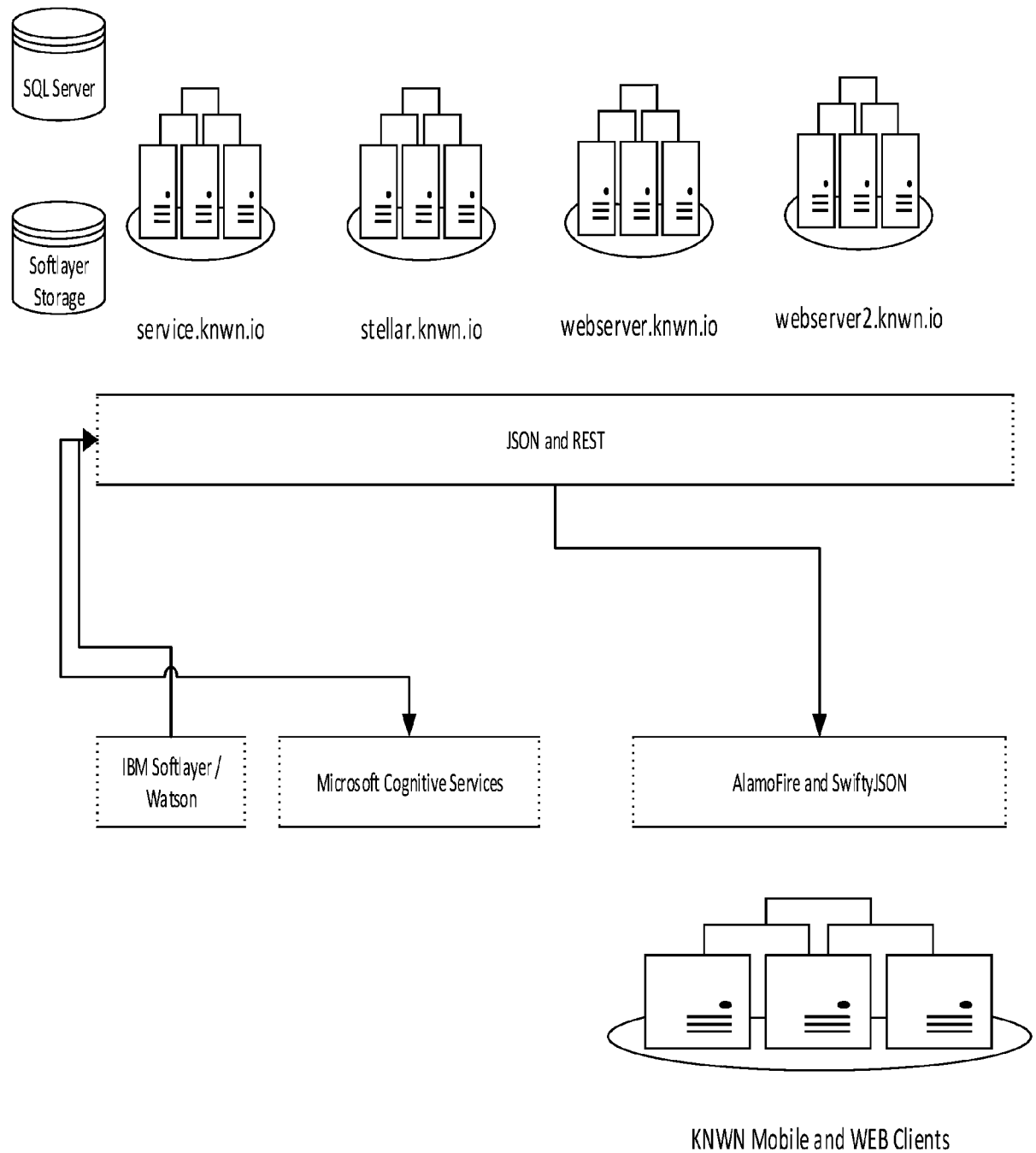
FIG. 3 a non-limiting system architecture block diagram in accordance with the system and method of the present disclosure.

As seen in FIG. 3, the system and method can preferably receive a continual stream of IOT and Biometric data via API from connected devices and browsers. IOT items can be preferably electronically sent one at a time in bursts of web service hits. Biometric captures can be electronically sent in slices. In parallel, the system and method electronically captures and correlates this data to prefect/perfect an identity match. The digital data can be electronically sent to the system via REST API and digitally/electronically read to a set of parallel servers which curate the data sets and automatically feed them to the AI of the system for continual learning.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, processing components, capturing components, electronic storage mechanisms, etc. discussed above or shown in the drawings, if any, are merely by way of example and are not considered limiting and other component(s) and their locations, electronic communication methods, processing components, capturing components, electronic storage mechanisms, etc. can be chosen and used and all are considered within the scope of the disclosure. It is also recognized that many of the processes and digital steps performed by the disclosed system and method may be achieved through various types of digital technology, including without limitation, physical servers, virtual services, cloud based technology, etc.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the disclosure has been described in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A software-based method for evolving a biometric signature for an individual with each subsequent validation for use in identifying or authenticating the individual for a transaction or other activity in order to decrease the processing time required for identifying or authenticating the individual and to improve the accuracy of the identification or authentication, comprising the steps of:
(a) continually and passively receiving or capturing current digital data from an electronic device possessed by an individual by an electronic system prior to authenticating the individual for a transaction, wherein the current digital data includes Internet of Things data; wherein the Internet of Things data is passively obtained from electronic devices around or in range of the individual without regard to whether the electronic devices are registered or not with the electronic system;
(b) adding the current digital data to a stack of previously stored digital data for the individual;
(b1) creating an updated stack of digital data using the current digital data and the stack of previously stored digital data;
(b2) evolving a biometric signature for the individual using the updated stack of digital data;
(c) storing the updated stack to one or more electronic storage devices;
(d) where a number of digital data captures for the individual previously received or captured for the stack has reached a previously determined or programmed maximum number of digital data captures, electronically deleting an oldest stored digital data capture from the stack so that the updated stack does not exceed the maximum number of digital data captures with the addition of the current digital data in step (b);

(e) causing a neural network component of the electronic system to relearn and evolve the biometric signature for the individual each time the stack of digital data for the individual is updated; and (f) anticipating behavioral patterns for the individual based on the updated stack of digital data.

2. The software-based method of claim 1 wherein step (a) comprises passively receiving a continual stream of biometric data and Internet of Things data by the electronic system.

3. The software-based method of claim 2 wherein the Internet of Things data is electronically sent one at a time in bursts of web service hits.

4. The software-based method of claim 3 wherein the current digital data captured by the electronic system is electronically sent to the electronic system in slices.

5. The software-based method of claim 4 wherein in parallel the electronic system captures and correlates the Internet of Things data and current digital data for the biometric signature used for an identity match of the individual.

6. The software-based method of claim 1 further comprising the step of electronically sending the current digital data to the electronic system via a REST API.

7. The software-based method of claim 1 further comprising the step of reading the current data by a set of parallel servers for curating data sets.

8. The software-based method of claim 7 further comprising the step of electronically feeding the curated data sets to an artificial intelligence component of the electronic system for continual learning by the electronic system.

9. The software-based method of claim 1 further comprising the step of feeding the updated stack to an artificial intelligence component of the electronic system for continual learning by the electronic system in connection with current biometrics for the individual.

10. The software-based method of claim 1 wherein the maximum number is 500 digital data.

11. The software-based method of claim 2 further comprising the step of prefetching the previously stored digital data for the individual using the Internet of Things data.

12. A software-based method for evolving a biometric signature for an individual with each subsequent validation for use in identifying or authenticating the individual for a transaction or other activity in order to decrease the processing time required for identifying or authenticating the individual and to improve the accuracy of the identification or authentication, comprising the steps of:

(a) continually and passively receiving or capturing current digital data from an electronic device possessed by an individual by an electronic system prior to authenticating the individual for a transaction, wherein the current digital data includes Internet of Things data; wherein the Internet of Things data is passively obtained from electronic devices around or in range of the individual without regard to whether the electronic devices are registered or not with the electronic system;

(b) adding the current digital data to a stack of previously stored digital data for the individual;

(c) creating an updated stack of digital data using the current digital data and the stack of previously stored digital data;

(d) evolving a biometric signature for the individual using the updated stack of digital data;

(e) storing the updated stack to one or more electronic storage devices;

(f) where a number of digital data captures for the individual previously received or captured for the stack has reached a previously determined or programmed maximum number of digital data captures, electronically deleting an oldest stored digital data capture from the stack so that the updated stack does not exceed the maximum number of digital data captures with the addition of the current digital data;

(g) causing a neural network component of the electronic system to relearn and evolve the biometric signature for the individual each time the stack of digital data for the individual is updated;

(h) anticipating behavioral patterns for the individual based on the updated stack of digital data; and (i) prefetching the previously stored digital data for the individual using the Internet of Things data.

* * * * *